(12) United States Patent
Lundby

(10) Patent No.: US 6,993,352 B2
(45) Date of Patent: Jan. 31, 2006

(54) ACKNOWLEDGING MISSED MESSAGES BROADCAST ON A CONTROL CHANNEL

(75) Inventor: Stein A. Lundby, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 169 days.

(21) Appl. No.: 10/032,261

(22) Filed: Dec. 20, 2001

(65) Prior Publication Data

US 2003/0119557 A1 Jun. 26, 2003

(51) Int. Cl.
*H04Q 7/20* (2006.01)
(52) U.S. Cl. ......................................... 455/466; 455/69
(58) Field of Classification Search ........ 455/418–420, 455/436, 437, 466, 522, 70, 69, 414.1–414.4, 455/510, 66.18–67.7, 115.1–115.4, 226.1–226.4
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,745,842 A | * | 4/1998 | Priest ........................... 455/69 |
| 5,862,171 A | * | 1/1999 | Mahany ...................... 375/132 |
| 6,275,712 B1 | * | 8/2001 | Gray et al. ................. 455/522 |
| 6,505,058 B1 | * | 1/2003 | Willey ........................ 455/574 |
| 2001/0040877 A1 | | 11/2001 | Love et al. |

FOREIGN PATENT DOCUMENTS

EP 0938207 A2 8/1999

OTHER PUBLICATIONS

Naijoh et al. "ARQ Schemes with Adaptive Modulation/TDMA/TDD Systems for Wireless Multimedia Communication Services", Personal, Indoor and Mobile Radio Communications, 1997. Waves of the Year 2000. PIMRC '97., The 8th IEEE International Symposium on Helsinki, Finland Sep. 1-4, 1997, New York, NY, USA, IEEE US, Sep. 1, 1997, pp. 709-713.

* cited by examiner

*Primary Examiner*—Charles Craver
(74) *Attorney, Agent, or Firm*—Philip R. Wadsworth; Thien T. Nguyen; Kyong H. Macek

(57) ABSTRACT

Methods and apparatus are presented for acknowledging missed control channel messages. In a system wherein control channel messages can be used to send the transmission parameters of signals on a data traffic channel, the inability to decode the latest control channel message can cause a delay in system throughput. Functionality is added to the acknowledgment channel, which is already in place to acknowledge the receipt of data subpackets on the data traffic channel, so that acknowledgments of missed control channel messages can be conveyed. A pattern or multiplicity of acknowledgment signals can be used to request transmissions of control channel messages. An infrastructure element can be configured to read the acknowledgment signals as a request for a broadcast on the control channel.

15 Claims, 2 Drawing Sheets

US 6,993,352 B2

ACKNOWLEDGING MISSED MESSAGES BROADCAST ON A CONTROL CHANNEL

BACKGROUND

1. Field

The present invention relates generally to communications, and more specifically, to acknowledging missed control messages that were broadcast on control channels.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communications systems that can be implemented. Some of these various communications systems are configured to allow the transmission of data traffic between subscriber units and base stations. In systems that are designed to carry data traffic, it is always desirable to optimize the data throughput of the system. It is also desirable to allocate the channel resources without waste. The embodiments described herein address the need to conserve channel resources by restraining base stations from transmitting data packets to those remote stations that are not ready to receive data packets. Moreover, the embodiments are for notifying base stations to re-transmit broadcast messages on the control channel.

SUMMARY

Methods and apparatus are presented herein to address the needs stated above. In one aspect, an apparatus is presented for triggering a broadcast of a transmission parameters message from a base station, the apparatus comprising: a memory element; and a processing element configured to execute a set of instructions stored in the memory element, the set of instructions for: determining whether a stored set of transmission parameters is current; if the stored set of transmission parameters is not current, then transmitting a re-transmission request on a reverse link channel to a base station; and if the stored set of transmission parameters is current, then decoding a data packet using the stored set of transmission parameters.

In another aspect, an apparatus is presented for controlling a broadcast of a control message, the apparatus comprising: a memory element; and a processing element configured to execute a set of instructions stored in the memory element, the set of instructions for: transmitting the control message to a remote station, herein the control message contains a set of transmission parameters by which a data packet is to be transmitted; monitoring a reverse link channel for a re-transmission request; if a re-transmission request arrives on the reverse link channel, then re-transmitting the control message; and if a re-transmission request does not arrive on the reverse link channel, then transmitting the data packet.

In another aspect, a method is presented for acknowledging missed control messages that are broadcast from a base station to a remote station, the method comprising: transmitting a control message from the base station to the remote station, wherein the control message contains a set of transmission parameters for a data packet to be subsequently transmitted to the remote station; monitoring a reverse link channel at the base station for a re-transmission request from the remote station; determining whether a set of transmission parameters stored at a remote station is current; if the stored set of transmission parameters is not current, then transmitting a re-transmission request on the reverse link channel to the base station, whereupon the base station re-transmits the control message; and if the stored set of transmission parameters is current, then not transmitting a re-transmission request on the reverse link channel to the base station, whereupon the base station transmits the data packet, which the remote station will subsequently receive and decode using the stored set of transmission parameters from the control message.

DETAILED DESCRIPTION

Figure 1:
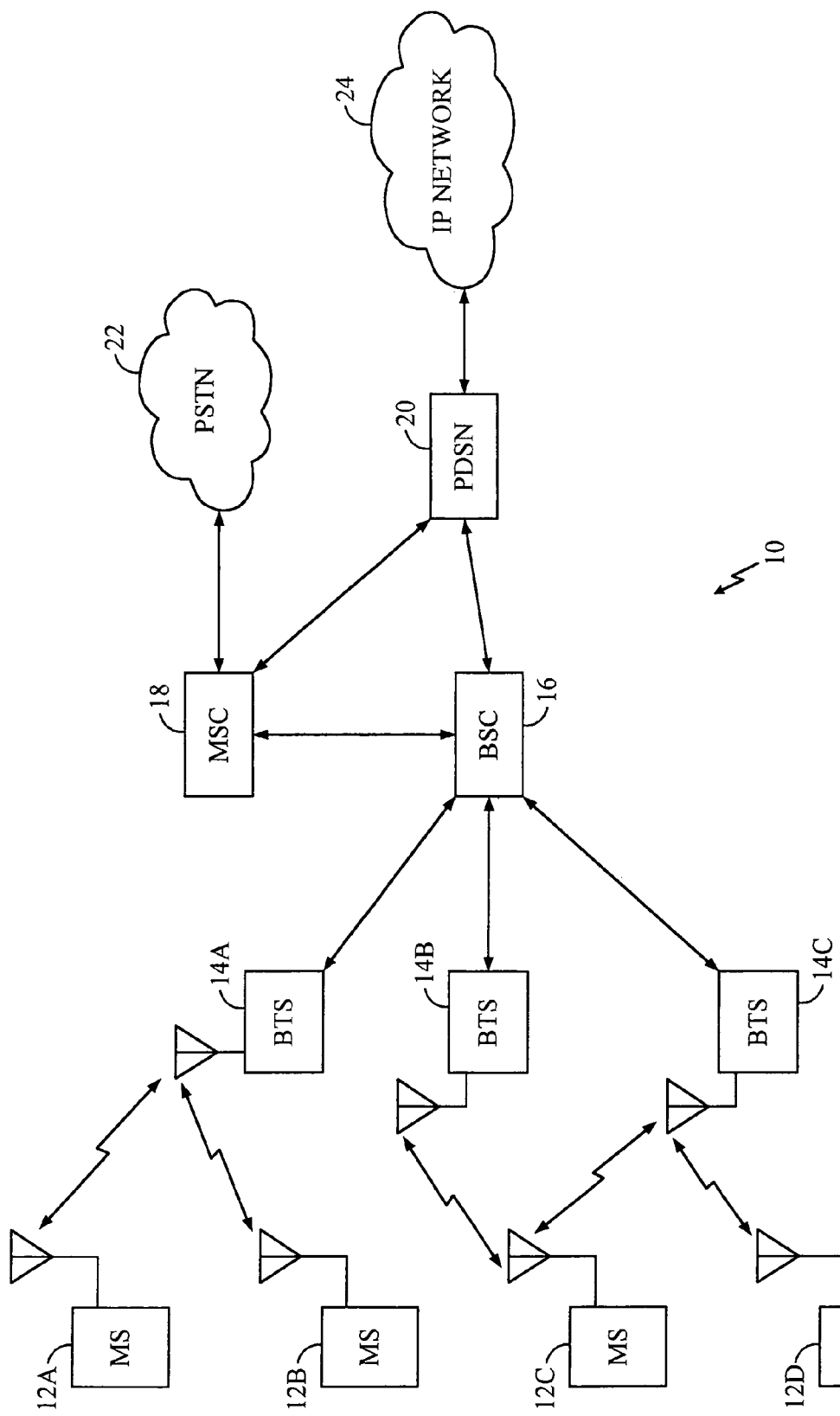
FIG. 1 is a diagram of a wireless communication network.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration.

Since a channel can use variable length Walsh codes and a variety of optional coding and modulation formats, it is desirable for the decoder at a receiving end to be informed as to the actual transmission parameters used at the transmission end. Otherwise, the decoder would have to be run repetitiously over the received transmissions using each set of transmission formats, and the results from each run would have to be checked for errors. Errors can be determined from the use of cyclic redundancy check (CRC) bits, which indicates that the original data bits have been recovered if the CRC bits match an expected value. For large data packet transfers, a straightforward decoding process based only upon data traffic channel information can be time-consuming and resource consuming. In certain circumstances, the received information may be in error but may still be desirable to receive and store, thereby eliminating the possible need to determine the transmission parameters by decoding over all possible received transmissions and transmission formats. For example, a system using incremental redundancy to combine re-transmissions would operate in this manner.

Transmission parameters can be carried over one or several separate control channels, which can be implemented to transmit occasionally or to transmit each time a data traffic transmission occurs. The receipt of the transmission parameters will allow the decoder to quickly reset the decoding and demodulation settings of certain internal components to the appropriate settings. In addition, the receipt of the transmission parameters on the control channel means that the decoder need not perform time-consuming and resource-consuming calculations for alternative transmission parameters on the data traffic channel.

The decoder operates by decoding the control channel message using one set of transmission parameters and checking the CRC bits of the decoded control message. If the control channel message could have been transmitted using any of several transmission formats, then the decoder repeats the decoding process with another set of transmission parameters. The decoder is configured to perform this process for each set of transmission parameters until the CRC bits pass. It should be noted that the process of demodulating and decoding the control channel to determine the transmission parameters of the data traffic channel, and using the transmission parameters carried by control channel to decode the data traffic channel is more efficient than demodulating and decoding the data traffic channel without pre-knowledge of the transmission parameters.

However, problems arise with this process when the decoder cannot determine the contents of the control channel due to decoding errors. As discussed above, the messages on the control channel are broadcast from a base station to one or all of the remote stations, both mobile and stationary, that operate within the range of the base station. The nature of broadcasting in wireless communication systems is such that no acknowledgements are expected by the base station or generated by the remote station. Hence, the base station has no way to determine if a target station has retrieved the information that was broadcast on the control channel. If the remote station cannot retrieve the information carried by the control channel, then it is likely that the remote station will be unable to retrieve the information carried by the associated data traffic channel. Any transmissions from the base station on the data traffic channel will be wasted until the remote station decodes the transmission parameters carried by a subsequent control channel broadcast. Therefore, channel resources on the forward link are wasted due to the inability of the remote station to properly decode the channel.

Typically, the above-described problem arises when a remote station enters the range of a new base station, or if system parameters have changed on the existing base station. If the remote station does not have a recent broadcast message on the control channel, the remote station will not be able to decode any of the data traffic messages targeted for the remote station. This situation could arise when the remote station is attempting to retrieve data packets from a PDSN while leaving the range of one base station and entering the range of another base station.

The embodiments described herein are directed to new methods and apparatus for minimizing the waste associated with the transmission of data on the data traffic channels when the target mobile station is unable to decode the associated control channel broadcast. In particular, the embodiments use an already existing acknowledgment channel, which is configured for controlling the forward link data rate, in a manner that informs a transmitting base station that the target mobile station has missed a control channel broadcast.

The acknowledgment (ACK) channel in a cdma2000 1xEV system is used on the reverse link to directly acknowledge the receipt of data subpackets on the data traffic channel. The ACK channel is binary phase shift key (BPSK) modulated, wherein one bit, either 0 or 1, indicates whether a subpacket has been accurately decoded or not.

Figure 2:
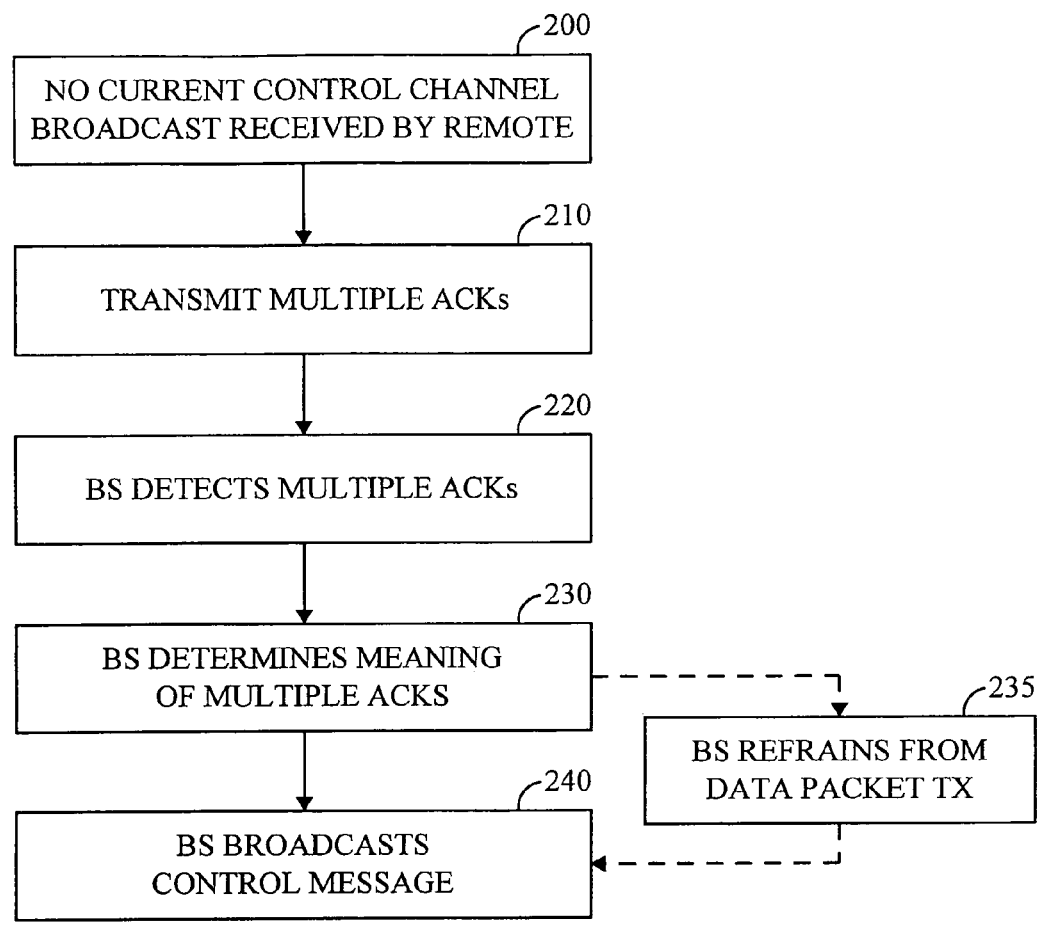
FIG. 2 is a flowchart of an embodiment for informing a base station that a remote station did not receive a broadcast message from the base station.

FIG. 2 is a flowchart illustrating an embodiment for using the ACK channel on the reverse link to signal the base station that a broadcast on the control channel was missed. At step 200, a remote station determines that no current broadcast information has been received on a control channel. At step 210, the remote station starts a multiple transmission of ACK signals. A processor and memory within a remote station can be configured to perform the steps described above. At step 220, the base station detects the multiple ACK signals from the remote station. At step 230, an infrastructure element within the base station determines that the multiple ACK signals are a request for a broadcast on the control channel. At step 240, the base station broadcasts a control message on the control channel.

In an alternate embodiment, the steps described in FIG. 2 are supplemented by an additional step 235, wherein the base station refrains from transmitting to the remote station on the data traffic channel until after the control message of step 240 is broadcast.

In one embodiment, a criteria that can be used by the remote station to determine that no current broadcast on the control channel has been received is the successful completion of a hand-off to a new base station. A hand-off is a process whereby a remote station establishes communications with a second base station while ending communications with a first base station. In another embodiment, a criteria that can be used by the remote station to determine that no current broadcast on the control channel has been received is the inability to decode data packets received on the data traffic channel using a current set of transmission parameters.

In another embodiment, the remote stations and base stations within a system use a predetermined number of ACK transmissions to indicate the need for a new transmission parameters message on the control channel. In the current standards for cdma2000, it has been mandated that the remote station shall transmit at the most one redundant positive ACK in response to a received data subpacket. Hence, the multiple ACK signals alone could serve as a criteria for determining the need for a new broadcast on the control channel. For example, three or more continuous ACK signals would signify that the remote station needs a new transmission parameters message.

In another embodiment, the criteria for determining the need for a new broadcast on the control channel is the absence of a transmission to the remote station on a data traffic channel before the receipt of the multiple ACK signals. In other words, ACK signals received upon the ACK channel are expected whenever data is transmitted on a data traffic channel. ACK signals are not expected when there are no data transmissions. Hence, the infrastructure element would be configured to detect the incongruity of receiving ACK signals in the absence of data traffic.

In another embodiment, the remote stations and base stations within a system use a predetermined pattern of ACK transmissions to indicate the need for a new transmission parameters message on the control channel.

In an alternate embodiment, the remote stations and base stations within a cdma2000 system can use the channel quality feedback channel (CQI) to signal the need for a new transmission parameters message on the control channel. The channel quality feedback channel is used by the remote station to convey channel quality measurements of the best serving sector to the base station. The channel quality is measured in terms of a carrier-in-interference (C/I) ratio and is based upon received forward link signals. The C/I value is mapped onto a five-bit CQI symbol, wherein the fifth bit is reserved. In this alternative embodiment, the fifth bit can be used individually or as part of a pattern to indicate an acknowledgment of a missed control channel message.

Figure 3:
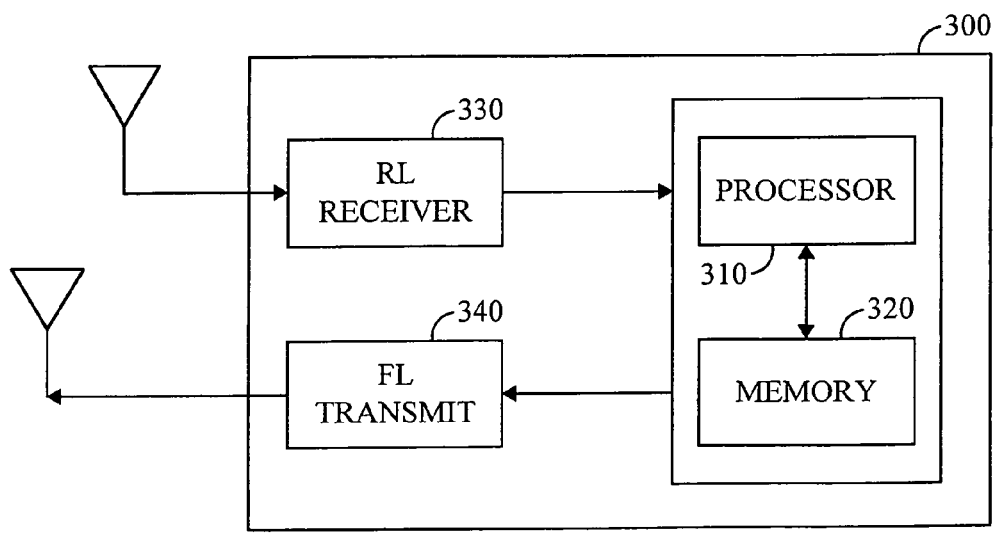
FIG. 3 is a block diagram of an infrastructure element for controlling transmissions on a control channel, based upon received ACK signals.

FIG. 3 is a block diagram of an infrastructure element that can implement the embodiments described above. The infrastructure element 300 can comprise a processor 310, coupled to a memory element 320, configured to perform the control re-broadcasts on the control channel. The infrastructure element also comprises one or several reverse link receiving elements 330 and forward link transmission elements 340. On the reverse link, the processor 310 detects signals indicating the need for new transmission parameters message for remote stations $\{M_1, M_2, \ldots, M_i\}$ and stores this information in the memory element 320. The processor 310 determines when to transmit the transmission parameters message again, based on information such as the amount of data awaiting transmission, the delay of data awaiting transmission, the number of remote stations in need of a new transmission parameters message, and a change in system parameters.

The processor element 310 also ensures that data transmissions on the data traffic channels do not occur to remote stations $M_1$ through $M_i$ before the transmission parameters message is broadcast on the control channel. Alternatively, the processor element 310 allows data transmissions to remote stations $M_1$ through $M_i$ only if the data transmissions can occur with parameters already known by the remote stations, such as parameters contained in the last successful transmission parameters message. Upon determining the need to transmit a new transmission parameters message, the processor element 310 instructs the forward link transmission element to transmit the control message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus within a remote station of a wireless communication system, comprising:
    a memory element; and
    a processing element configured to execute a set of instructions stored in the memory element, the set of instructions for:
    determining whether a stored set of transmission parameters is current; and
    if the stored set of transmission parameters is not current, then transmitting a re-transmission request for a current set of transmission parameters on a channel quality feedback (CQI) channel to a base station, wherein the re-transmission request is carried by the fifth bit of a CQI symbol.

2. The apparatus of claim 1, wherein the re-transmission request is carried by the fifth bit of more than one CQI symbol.

3. The apparatus of claim 1, wherein determining whether the stored set of transmission parameters is current comprises:
performing a hand-off from a previous base station to the base station; and
if the hand-off is successfully completed, then determining that the stored set of transmission parameters is not current.

4. The apparatus of claim 1, wherein determining whether the stored set of transmission parameters is current comprises:
attempting to decode the data packet using the stored set of transmission parameters; and
if the data packet cannot be decoded using the stored set of transmission parameters, then determining that the stored set of transmission parameters is not current.

5. The apparatus of claim 1, wherein, if the stored set of transmission parameters is current, then decoding a data packet at the remote station using the stored set of transmission parameters.

6. In a wireless communication system, an infrastructure element, comprising:
a memory element; and
a processing element configured to execute a set of instructions stored in the memory element, the set of instructions for:
transmitting a control message to a remote station, the control message contains a set of transmission parameters by which a data packet is to be transmitted;
monitoring a Channel Quality Feedback (CQI) Channel for a re-transmission request, wherein the re-transmission request is carried by the fifth bit of a CQI symbol;
if a re-transmission request arrives on the Channel Quality Feedback (CQI) Channel, then re-transmitting the control message; and
if a re-transmission request does not arrive on the Channel Quality Feedback (CQI) Channel, then transmitting the data packet.

7. The element of claim 6, wherein the re-transmission request is carried by the fifth bit of more than one CQI symbol.

8. A method in a wireless communication system, comprising:
determining at a remote station whether a set of transmission parameters stored at the remote station is current; and
if the stored set of transmission parameters is not current, then transmitting a re-transmission request on a Channel Quality Feedback (CQI) Channel to a base station, wherein the re-transmission request is carried by the fifth bit of a CQI symbol.

9. The method of claim 8, wherein if the stored set of transmission parameters is current, then decoding a data packet at the remote station using the stored set of transmission parameters.

10. A method for controlling a re-broadcast of a control message, comprising:
transmitting the control message to a remote station, wherein the control message contains a set of transmission parameters by which a data packet is to be transmitted;
monitoring a Channel Quality Feedback (CQI) Channel for a re-transmission request, wherein the re-transmission request is carried by the fifth bit of a CQI symbol;
if a re-transmission request arrives on the Channel Quality Feedback (CQI) Channel, then re-transmitting the control message; and
if a re-transmission request does not arrive on the Channel Quality Feedback (CQI) Channel, then transmitting the data packet.

11. An apparatus in a wireless communication system, comprising:
means for determining at a remote station whether a set of transmission parameters stored at the remote station is current; and
means for determining a re-transmission request on a Channel Quality Feedback (CQI) Channel to a base station if the stored set of transmission parameters is not current, wherein the re-transmission request is carried by the fifth bit of a CQI symbol.

12. The apparatus of claim 11, wherein the re-transmission request is carried by the fifth bit of more than one CQI symbol.

13. The apparatus of claim 11, wherein the means for determining whether the stored set of transmission parameters is current comprises:
means for performing a hand-off from a previous base station to the base station; and
means for determining that the stored set of transmission parameters is not current, if the hand-off is successfully completed.

14. The apparatus of claim 11, wherein means for determining whether the stored set of transmission parameters is current comprises:
means for attempting to decode the data packet using the stored set of transmission parameters; and
means for determining that the stored set of transmission parameters is not current, if the data packet cannot be decoded using the second set of transmission parameters.

15. The apparatus of claim 11, further comprising:
means for decoding a data packet at the remote station using the stored set of transmission parameters, if the stored set of transmission parameters is current.

* * * * *